United States Patent

[11] 3,601,643

| [72] | Inventors | Gerd E. Krulls<br>Scotia;<br>William L. Durrwang, Schenectady, both of, N.Y. |
|---|---|---|
| [21] | Appl. No. | 16,647 |
| [22] | Filed | Mar. 5, 1970 |
| [45] | Patented | Aug. 24, 1971 |
| [73] | Assignee | General Electric Company |

[54] ANTIEROSION FEED SLOT FOR LIQUID METAL COLLECTOR
2 Claims, 3 Drawing Figs.

[52] U.S. Cl. .................................................. 310/219
[51] Int. Cl. .................................................. H02k 29/00
[50] Field of Search .................................................. 310/227, 219, 232, 178

[56] References Cited
UNITED STATES PATENTS
3,191,082  6/1965  Csillag.......................... 310/227 X

*Primary Examiner*—Milton O. Hirshfield
*Assistant Examiner*—B. A. Reynolds
*Attorneys*—William C. Crutcher, Bryan C. Ogden, Frank L. Neuhauser, Oscar B. Waddell and Joseph B. Forman ABSTRACT: In a liquid metal collector of the rotatable cup-type, the stationary member is provided with a segmented conductor blade such that a circumferential liquid feed groove and circumferential liquid pressure groove are formed between rings. At the bottom of each groove, respectively, a pressure pickup hole and feed hole are provided such that the proper level of liquid metal is maintained in the rotatable cup. By placing the pressure pickup hole and feed hole where the liquid metal velocity is relatively quiescent, erosion of the conductor ring at the discontinuities is prevented.

PATENTED AUG 24 1971 3,601,643

INVENTORS:
GERD E. KRULLS,
WILLIAM L. DURRWANG,

BY *Bryan C. Ogden*
THEIR ATTORNEY.

ANTIEROSION FEED SLOT FOR LIQUID METAL COLLECTOR

BACKGROUND OF THE INVENTION

This invention is related to electrical collector apparatus in general, and more particularly to electrical collectors connecting rotating and stationary members through a fluid conductive medium. Specifically, the present invention relates to an improved design of the stationary blade member which is in electrical contact with the fluid conductive medium during operation.

In dynamoelectric machines, it has long been conventional practice to transmit electric current from a stationary member to a rotating member by means of carbon brushes. In large dynamoelectric machines, it is a DC current transmitted to shaft field windings that creates the electromagnetic field. As current densities have increased, carbon brushes have become less suitable and recent developments have included the use of a liquid metal disposed between the stationary member and the rotating member in order to transmit the current therebetween.

Metals that may be used in such liquid metal collectors are mercury, sodium potassium and others capable of conducting current.

Incorporated herein by reference is U.S. Pat. No. 3,444,408 issued on May 13, 1969 to Gerd E. Krulls and assigned to the assignee of the present invention. This patent shows a cup-type liquid metal collector in which the electrically conductive metal such as mercury is contained in the cup during operation, and a stationary conductor blade member extends into the liquid metal during such operation. The blade member, of course, serves to conduct the field current from the exciter through the liquid metal to the rotating cup which is in communication electrically with the field windings.

The problem occurs when the liquid metal which rotates with the rotating cup tends to erode the blade member. As the rotating cup carries the liquid metal at rotational speeds of from 1800 r.p.m. in a four-pole machine to 3600 r.p.m. in a two-pole machine, it will be appreciated that the friction of the fast moving liquid metal passing over the surfaces of the blade member indeed tends to erode the blade, particularly at any discontinuity in the blade surface. In the prior art, a feed hole extended radially outward through the blade and opened directly on a blade surface, thereby creating such a discontinuity which resulted in erosion during operation. The mercury feed hole is necessary to allow control of the mercury level in the cup.

Another form of discontinuity in the prior art blades was the pressure pickup hole which was located on the surface of the blade. A pressure pickup is desirable for measuring the static pressure produced by the rotating liquid metal in order to properly monitor the amount of liquid metal to be added through the liquid metal feed hole.

Accordingly, one object of the present invention is to provide a liquid metal collector with a blade which has improved antierosion characteristics.

Other objects, advantages and features of the present invention will become apparent from the following description of one embodiment thereof when taken in connection with the accompanying drawing.

SUMMARY OF THE INVENTION

Figures 1, 2, 3:
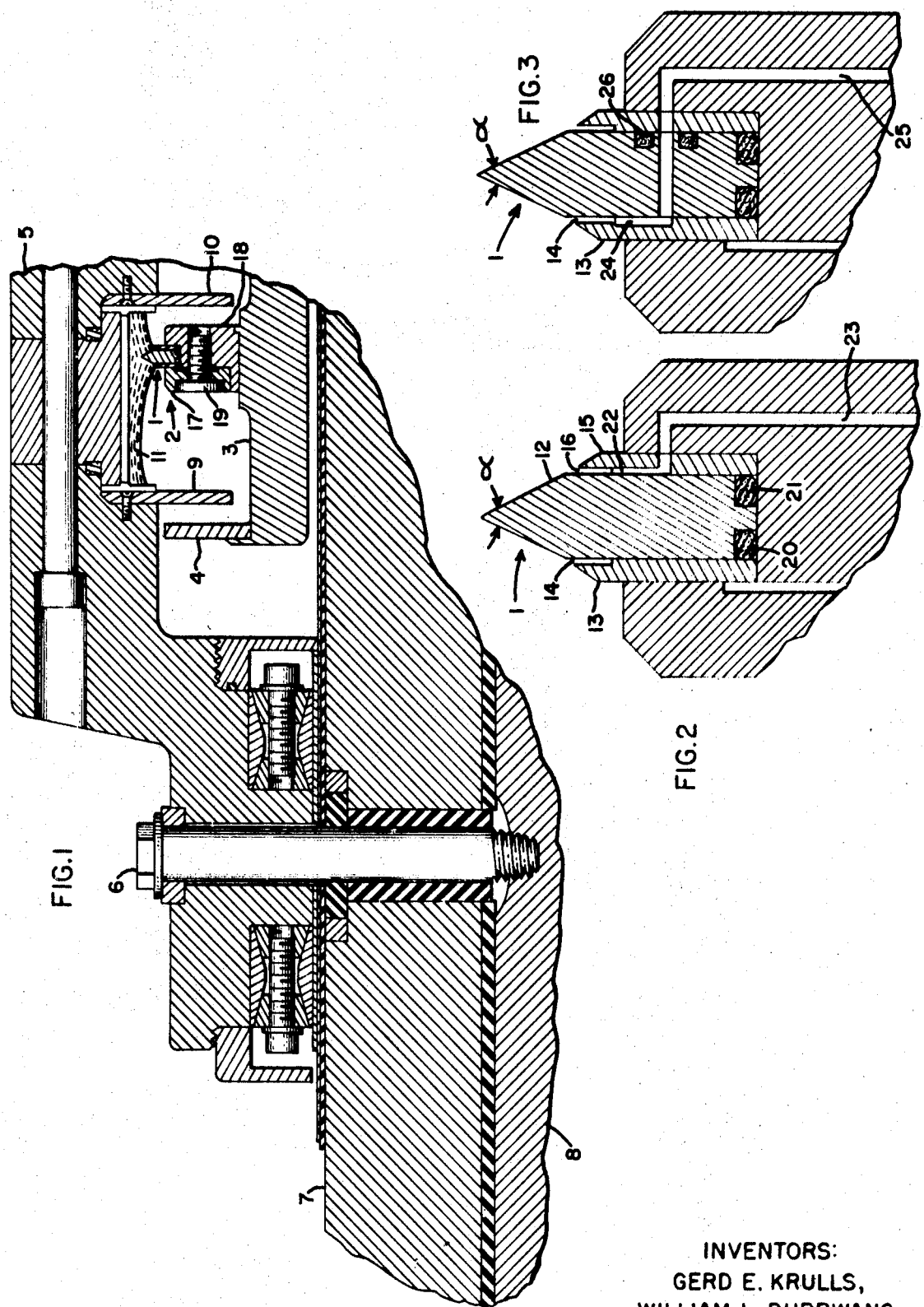
FIG. 1 is a view in section of the present invention showing its relation to the rotating cup.
FIG. 2 is a cross-sectional view taken at a circumferential position showing the pressure pickup hole and groove.
FIG. 3 is a cross-sectional view taken at a circumferential position showing the liquid metal feed hole and groove.

Briefly stated, the present invention is practiced in one form by providing a plurality of grooves in the liquid metal collector blade element whereby the liquid metal within the grooves will rotate at a much lower velocity compared to the velocity over the exterior surface of the blade. The lower velocity results in reduced erosion at the discontinuities within the grooves.

DESCRIPTION OF THE PREFERRED EMBODIMENT

Referring now to FIG. 1, the stationary annular conductor blade is generally indicated as 1 and is positioned in a circumferentially extending conductor blade holder indicated generally at 2. The blade holder 2 is in turn positioned about a circumferentially extending stationary member 3 which is only partially shown. The stationary member 3 has a circumferentially extending disk member 4 attached to one end thereof for sealing purposes, while the opposite end of the stationary member 3 has a similar seal and extends axially outward to communicate with a source of current (not shown).

The rotatable cup, or channel member is generally indicated as 5. Although only partially shown, it extends circumferentially around the conductor blade 1, blade holder 2, and stationary member 3 and communicates electrically with the rotating field windings through stud 6 which is insulated from the outer portion of shaft 7 and connects with the axially extending field conductor bars 8. A plurality of circumferential seal rings 9, 10 extend radially inward from the rotatable cup 5 toward the stationary member 3. Axially between the seal rings 9, 10 are, of course, used for sealing and containing purposes for the liquid metal. It is within the rotatable cup 5 where the liquid metal is contained during the operation of the liquid metal collector. The liquid metal will flow radially outward by centrifugal force and will form an annular volume indicated as 11 on FIG. 1. As indicated, the conductor blade 1 will be partially immersed in the liquid metal during operation.

Turning now to a detailed description of the conductor blade 1 and the conductor blade holder 2, reference will be made to FIGS. 1 through 3. The conductor blade blade 1 is shown as comprised of three separate circumferential rings which are juxtaposed together by the conductor blade holder 2. The central circumferential ring 12 is the primary current carrying ring and has a tapered edge with an included angle indicated as $\alpha$, its preferred magnitude being on the order of 60°. Juxtaposed on one side of the central ring is the circumferential feed ring 13 which also has a partially tapered edge but which also has a relief 14 therein forming a circumferential groove around the conductor blade 1. As is apparent, the circumferential feed ring 13 extends radially to a point where the taper begins on the central circumferential ring 12. Positioned on the opposite side of the central ring 12 and having the same general configuration as feed ring 13 is the circumferential pressure ring 15. Pressure ring 15 also has a relief 16 therein and together with the central ring 12 forms a circumferential groove in the blade 1. Extending circumferentially around the base of the central circumferential ring is a pair of "O" rings 20, 21. These provide a sealing relationship between the central ring 12 and the feed and pressure rings 13 and 15 respectively.

The three circumferential rings are forced together to form a tight relationship by the clamping means comprising the conductor blade holder 2. A clamp side 17 is bolted to a base side 18 through a plurality of bolts 19. It will be appreciated that this method of forming the conductor blade 1 is conducive to periodic inspection and replacement, when necessary, of the conductor blade 1.

Turning now to a description of the pressure sensing apparatus and the liquid metal feed apparatus, particular reference will be made to FIGS. 2 and 3. In order to sense the pressure of the rotating liquid metal, a pressure pickup hole 22 is provided in the bottom of the circumferential pressure relief 16. It will be understood by those skilled in the art that pickup hole 22 will sense the pressure and transmit it through pressure line 23 to the appropriate pressure sensing apparatus, the details of which are immaterial hereto but which he found by referring to U.S. Pat. No. 3,444,408 which has been incorporated herein by reference. Depending upon the pressure which has been sensed, the liquid metal feed apparatus will be actuated to increase or decrease the level of the liquid metal in the rotatable cup 5. Positioned at the bottom of the circumferential feed relief 14 is the feed hole 24 which communicates with a source of liquid metal through feed line 25.

Positioned around the feed line 25 at its junction point with the central ring 12 and pressure ring 15 is a circumferential "O" 26, which is utilized for sealing purposes.

Although only a single pressure pickup hole and a single feed hole have been described, the overall conductor blade 1 may be comprised of a plurality of such holes for sensing the pressure at more than one circumferential point and feeding the liquid metal to the rotatable cup 5 at more than one circumferential point.

OPERATION OF THE INVENTION

During the operation of the present invention, it is understood that the liquid metal volume 11 contained within the rotatable cup 5 will be rotating at a certain rotational velocity. As previously mentioned, when a liquid metal is flowing over the surface of the conductor blade, there will be erosion of the conductor blade at the discontinuities thereon. The depth of the liquid metal at conductor blade 1 is maintained such that the feed and pressure rings are barely immersed at the top of their respective circumferential reliefs 14, 16. The liquid metal which does flow into the grooves will be in a relatively quiescent state and, as such, the impact it may have on the discontinuities is reduced, thereby greatly reducing erosion of the blade material.

A suitable static pressure is sensed at pickup hole 22 and through the pressure sensing apparatus will actuate the liquid metal feed apparatus to raise or lower the level of the liquid metal in the cup area. As the liquid metal is fed through the feed line 25, it will flow out of feed hole 24 and will be carried into the liquid metal volume 11 by the rotating action of the liquid metal. Again, due to the quiescent nature of the liquid metal within the grooves, the feed hole is not subject to the high rotational velocities of the liquid metal, thereby preventing erosion at the discontinuity.

It will be appreciated that there has been described herein a significant improvement in the collector blade design for a liquid metal collector whereby erosion of the ring material is substantially eliminated while the pressure sensing apparatus and the feed apparatus still function to maintain the proper amount of liquid metal in the rotatable cup.

What we claim as new and desired to secure by Letters Patent of the United States is:

1. A liquid metal collector for a dynamoelectric machine of the type having a rotatable cup member containing a quantity of electrically conductive liquid metal; a stationary member on which there are means to mount an annular conductor blade including at least two circumferential rings held together such that they define a smooth circumferential groove; said conductor blade so constructed and arranged as to be partially immersed in the rotating liquid metal during operation; and the groove extending radially inward from a position on the periphery of the conductor blade, and conduit means defined within said stationary member and communicating with said groove by means of an opening into the bottom part of said groove, so that the opening is less subject to erosion from the rotating metal.

2. The liquid metal collector as recited in claim 1 wherein there are three circumferential rings; a central primary current carrying ring of greater diameter having partially tapered outer edges, and a pair of side rings of lesser diameter juxtaposed on opposite sides of the central ring.